(12) United States Patent
Chakraborty et al.

(10) Patent No.: US 10,748,132 B2
(45) Date of Patent: Aug. 18, 2020

(54) SECURITY TOOL

(71) Applicant: Bank of America Corporation, Charlotte, NC (US)

(72) Inventors: Pinak Chakraborty, Hyderabad (IN); Rajesh Balireddy, Hyderabad (IN); Sandeep Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/037,641

(22) Filed: Jul. 17, 2018

(65) Prior Publication Data

US 2020/0027075 A1    Jan. 23, 2020

(51) Int. Cl.
*G06Q 20/32*     (2012.01)
*G06Q 20/40*     (2012.01)
*G06Q 50/00*     (2012.01)
*G06F 16/29*     (2019.01)

(52) U.S. Cl.
CPC ......... *G06Q 20/3224* (2013.01); *G06F 16/29* (2019.01); *G06Q 20/4016* (2013.01); *G06Q 50/01* (2013.01)

(58) Field of Classification Search
CPC ........... G06Q 20/3224; G06Q 20/4016; G06Q 50/01; G06Q 20/32; G06Q 20/40; G06Q 50/00; G06F 16/29
See application file for complete search history.

(56) References Cited

U.S. PATENT DOCUMENTS

| | | | |
|---|---|---|---|
| 5,910,988 A * | 6/1999 | Ballard | G06K 9/00973 705/75 |
| 6,574,377 B1 * | 6/2003 | Cahill | G06K 9/033 382/305 |
| 6,871,185 B2 | 3/2005 | Walker et al. | |
| 7,069,240 B2 * | 6/2006 | Spero | G06Q 20/20 |
| 7,416,118 B2 | 8/2008 | Throckmorton et al. | |
| 7,577,613 B2 * | 8/2009 | Tramontano | G06Q 20/0453 705/43 |
| 7,593,605 B2 * | 9/2009 | King | H04N 1/00244 382/313 |
| 8,538,820 B1 | 9/2013 | Migdal et al. | |
| 8,548,208 B2 * | 10/2013 | Schultz | G06F 21/32 340/5.8 |

(Continued)

OTHER PUBLICATIONS

NewsRX, "March Networks Corporation; March Networks Delivers Expanded Video Surveillance Portfolio for Small and Mid-Sized Retail Organization," Jun. 27, 2013, Computers, Networks & Communications, pp. 1-2. (Year: 2013).*

*Primary Examiner* — Kenneth Bartley
(74) *Attorney, Agent, or Firm* — Michael A. Springs

(57) ABSTRACT

An apparatus includes a memory and a hardware processor. The processor detects that a transaction involving a mobile device occurred. After detecting the transaction, the processor receives, from the mobile device, transaction information about the transaction, the transaction information comprising an identification of a merchant performing the transaction and an identification of a user of the mobile device. The processor receives, from the mobile device, a media file generated by the mobile device during the transaction and links the media file to the transaction information. The processor stores the transaction information and the media file in the memory.

20 Claims, 3 Drawing Sheets

(56) References Cited

U.S. PATENT DOCUMENTS

| | | | |
|---|---|---|---|
| 8,570,375 B1 | 10/2013 | Srinivasan et al. | |
| 8,725,652 B2* | 5/2014 | Faith | G06Q 20/40145 705/64 |
| 9,277,185 B2 | 3/2016 | Lipton et al. | |
| 9,668,121 B2 | 5/2017 | Naik et al. | |
| 9,767,585 B1* | 9/2017 | Carter, Jr. | G06T 11/60 |
| 9,779,589 B2* | 10/2017 | Suzuki | G07G 5/00 |
| 10,185,814 B2* | 1/2019 | Davis | H04L 63/0861 |
| 10,210,579 B1* | 2/2019 | Neveu | G06Q 10/1093 |
| 10,332,191 B1 | 6/2019 | Eckel | G06Q 30/0635 |
| 10,395,018 B2* | 8/2019 | Turgeman | G06F 3/017 |
| 10,410,235 B2* | 9/2019 | Faith | G06Q 30/0225 |
| 2003/0033252 A1* | 2/2003 | Buttridge | G06K 17/00 705/45 |
| 2003/0149731 A1* | 8/2003 | Ohwa | G06Q 10/107 709/206 |
| 2003/0161503 A1* | 8/2003 | Kramer | G06Q 20/04 382/115 |
| 2004/0064373 A1* | 4/2004 | Shannon | G06Q 20/0453 705/24 |
| 2004/0083134 A1* | 4/2004 | Spero | G06Q 20/20 705/16 |
| 2004/0098664 A1* | 5/2004 | Adelman | G06Q 99/00 715/201 |
| 2004/0122737 A1* | 6/2004 | Celi, Jr. | G06Q 20/10 705/17 |
| 2004/0225567 A1* | 11/2004 | Mitchell | G06Q 20/0453 705/16 |
| 2005/0097046 A1* | 5/2005 | Singfield | G06Q 20/042 705/42 |
| 2005/0114215 A1* | 5/2005 | Tramontano | G06Q 20/0453 705/16 |
| 2005/0222944 A1* | 10/2005 | Dodson, Jr. | G06Q 10/10 705/39 |
| 2007/0168295 A1* | 7/2007 | Wu | G06Q 20/20 705/64 |
| 2007/0182990 A1* | 8/2007 | Stephen | G06F 17/227 358/1.15 |
| 2008/0028473 A1* | 1/2008 | Cehelnik | G06Q 30/06 726/27 |
| 2008/0103972 A1* | 5/2008 | Lanc | G06Q 20/32 705/44 |
| 2009/0114716 A1* | 5/2009 | Ramachandran | G06Q 20/042 235/379 |
| 2010/0257005 A1* | 10/2010 | Phenner | G06Q 10/10 705/68 |
| 2011/0045852 A1* | 2/2011 | Kovach | G06Q 30/02 455/466 |
| 2011/0184819 A1* | 7/2011 | Mon | G06Q 20/20 705/16 |
| 2011/0258083 A1* | 10/2011 | Ren | G06Q 10/087 705/27.1 |
| 2012/0278155 A1* | 11/2012 | Faith | G06Q 20/40145 705/14.26 |
| 2012/0290421 A1* | 11/2012 | Qawami | G06Q 20/20 705/21 |
| 2012/0310657 A1* | 12/2012 | Jankowski | H04N 7/18 705/1.1 |
| 2013/0144785 A1* | 6/2013 | Karpenko | G06Q 20/409 705/44 |
| 2013/0218721 A1* | 8/2013 | Borhan | G06Q 20/322 705/26.41 |
| 2013/0226800 A1* | 8/2013 | Patel | G06Q 20/3224 705/44 |
| 2014/0195423 A1* | 7/2014 | Zheng | G06Q 20/105 705/41 |
| 2014/0217172 A1* | 8/2014 | McCauley | G07G 3/003 235/383 |
| 2014/0270409 A1* | 9/2014 | Hanna | G06Q 30/0609 382/118 |
| 2014/0279096 A1* | 9/2014 | Akin | G06Q 20/20 705/16 |
| 2014/0283113 A1* | 9/2014 | Hanna | G06F 21/32 726/27 |
| 2014/0304055 A1* | 10/2014 | Faith | G06Q 30/0225 705/14.26 |
| 2014/0362223 A1* | 12/2014 | LaCroix | H04N 7/183 348/150 |
| 2015/0199738 A1* | 7/2015 | Jung | G06Q 30/0609 705/26.35 |
| 2016/0104172 A1* | 4/2016 | Valentino, III | G07F 17/3241 705/18 |
| 2016/0125237 A1* | 5/2016 | Ghatage | G06K 9/00463 382/182 |
| 2016/0125404 A1* | 5/2016 | Roof | G06F 16/51 705/18 |
| 2016/0188958 A1* | 6/2016 | Martin | G06K 9/00228 382/118 |
| 2016/0210515 A1* | 7/2016 | Heier | G06Q 20/20 |
| 2016/0247160 A1* | 8/2016 | Hanna | G06F 21/32 |
| 2016/0277380 A1* | 9/2016 | Wagner | H04L 63/0861 |
| 2016/0300237 A1* | 10/2016 | Khan | G06Q 20/3223 |
| 2017/0109754 A1* | 4/2017 | Hanna | G06F 21/32 |
| 2017/0169381 A1 | 6/2017 | Lampe et al. | |
| 2017/0195477 A1* | 7/2017 | Jones-Mcfadden | H04M 1/72577 |
| 2018/0012307 A1 | 1/2018 | Hale | |
| 2018/0089680 A1* | 3/2018 | Castinado | G06Q 20/4014 |
| 2018/0124047 A1* | 5/2018 | Fisher | G06K 9/00624 |
| 2018/0189849 A1* | 7/2018 | Cho | G06Q 30/06 |
| 2019/0139023 A1* | 5/2019 | Vyas | G06Q 20/3224 |
| 2019/0156302 A1* | 5/2019 | Tonio | G06Q 20/0453 |
| 2019/0228461 A1* | 7/2019 | Domokos | G06Q 20/3223 |

* cited by examiner

SECURITY TOOL

TECHNICAL FIELD

This disclosure relates generally to security and fraud detection.

BACKGROUND

Computers and mobile devices are increasingly used to perform transactions with merchants. These transactions are then identified on accounting statements.

SUMMARY OF THE DISCLOSURE

Computers and mobile devices are increasingly used to perform transactions with merchants. For example, users can use their mobile phones to initiate purchases and payments with merchants. Additionally, merchants can use connected and/or mobile terminals to accept and process payments. After these transactions are processed, these transactions are identified on accounting statements. Users can review their accounting statements to see a list of transactions that have been performed over a period of time. The user can report fraudulent transactions that appear on these statements to prevent future fraud from occurring on the account.

In existing systems, users experience difficulties identifying transactions on these accounting statements because insufficient information about these transactions is kept and provided to the users. For example, many transactions are identified solely by an identification number or string and a money value of the transaction. Due to the complicated corporate structures involved with many merchants, the user may not even recognize the names of the companies that appear on the accounting statement. As a result, users are unable to identify many transactions and thus cannot determine whether those transactions are fraudulent. When these fraudulent transactions go unreported, fraud may continue to occur on the user's account.

This disclosure contemplates a security tool that makes it easier to identify fraudulent transactions, and in some instances, can automatically identify fraudulent transactions. The security tool links media files (e.g., audio, video, and/or photos) generated around the time of a transaction by the user's and merchant's devices. These media files can then be presented to the user along with other transaction information in an accounting statement. These media files can help the user recall details about the transaction and help the user identify which transactions may be fraudulent. For example, a user may see pictures taken by the user and the merchant around the time of the transaction in the accounting statement. If the user does not recognize the location or the merchant shown in the pictures, the user may determine that the transaction is fraudulent. Three embodiments of the security tool are described below.

According to an embodiment, an apparatus includes a memory and a hardware processor. The processor detects that a transaction involving a mobile device occurred. After detecting the transaction, the processor receives, from the mobile device, transaction information about the transaction, the transaction information comprising an identification of a merchant performing the transaction and an identification of a user of the mobile device. The processor receives, from the mobile device, a media file generated by the mobile device during the transaction and links the media file to the transaction information. The processor stores the transaction information and the media file in the memory.

According to another embodiment, a method includes detecting that a transaction involving a mobile device occurred. After detecting the transaction, the method includes receiving, from the mobile device, transaction information about the transaction, the transaction information comprising an identification of a merchant performing the transaction and an identification of a user of the mobile device. The method also includes receiving, from the mobile device, a media file generated by the mobile device during the transaction and linking the media file to the transaction information. The method further includes storing the transaction information and the media file.

According to yet another embodiment, a system includes a mobile device of a user, a merchant device, and a security tool. The security tool detects that a transaction involving the mobile device and the merchant device occurred and after detecting the transaction, receives, from the mobile device, transaction information about the transaction, the transaction information comprising an identification of the merchant of the merchant device and an identification of the user. The security tool receives, from the mobile device, a media file generated by the mobile device during the transaction and links the media file to the transaction information. The security tool stores the transaction information and the media file.

Certain embodiments provide one or more technical advantages. For example, an embodiment makes it easier to detect fraud on an account by capturing and linking media files to transactions. As another example, an embodiment improves the security of an account by automatically identifying fraudulent transactions. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
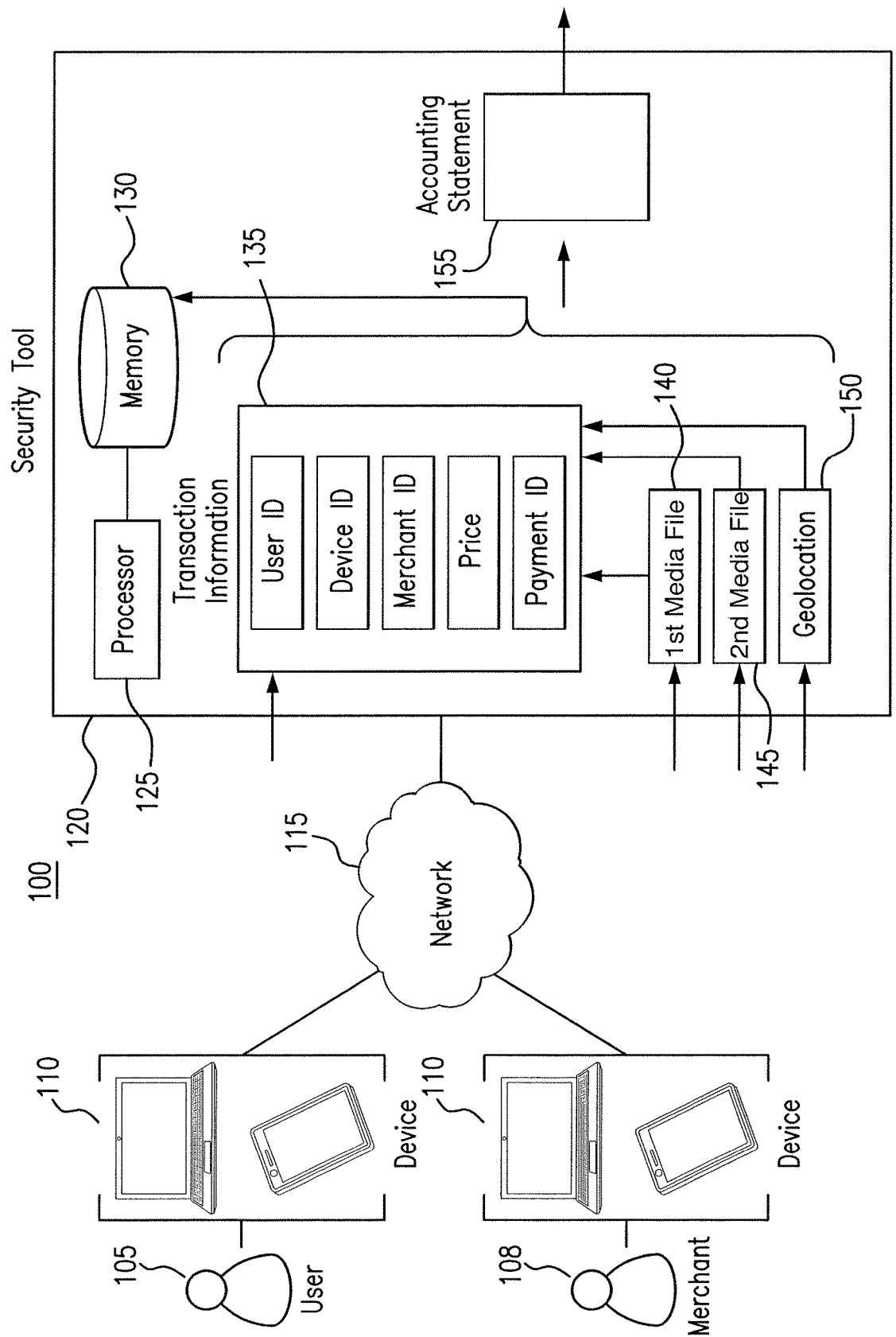
FIG. 1 illustrates an example security system.
Figure 2:
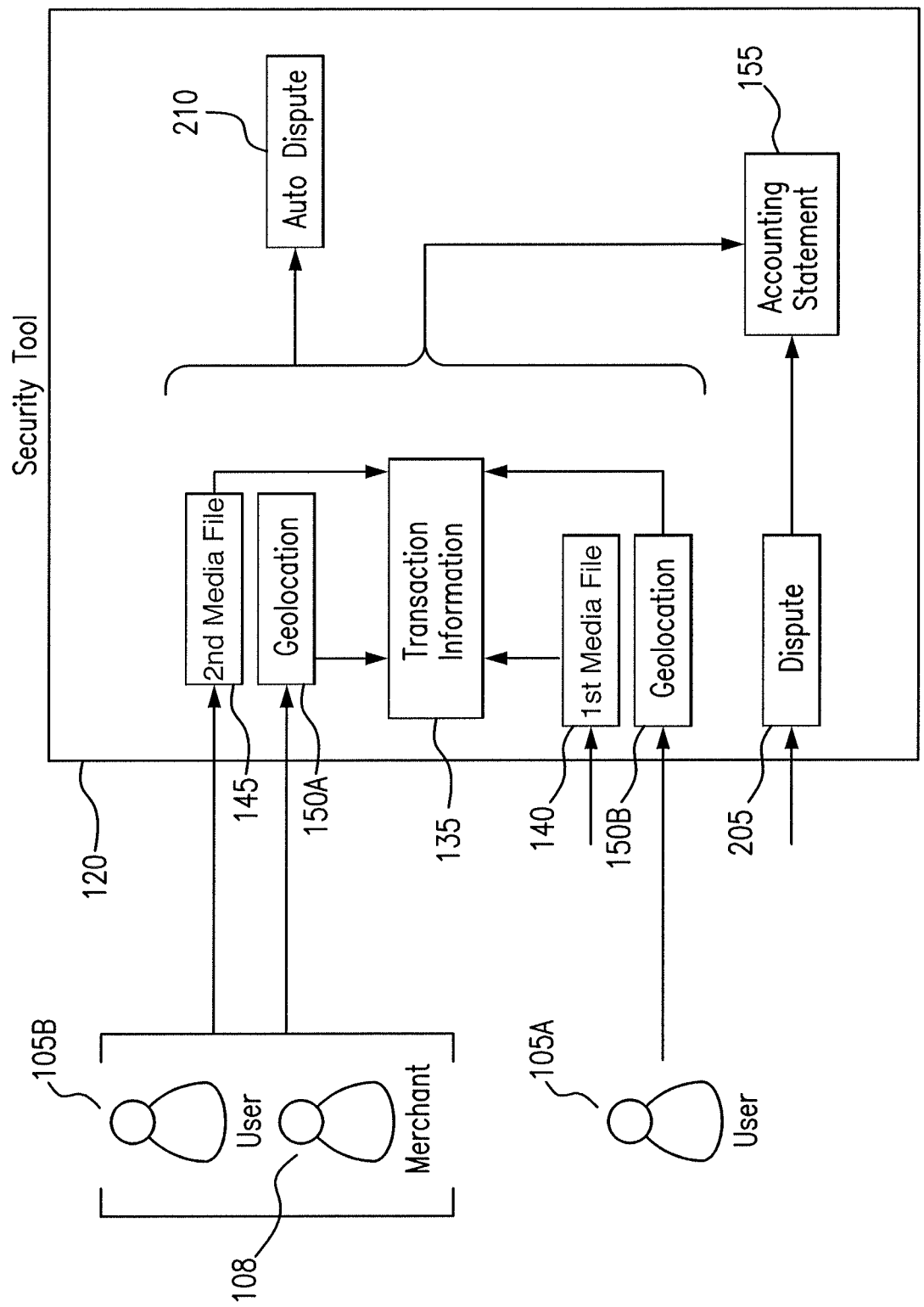
FIG. 2 illustrates portions of the example security system of FIG. 1.
Figure 3:
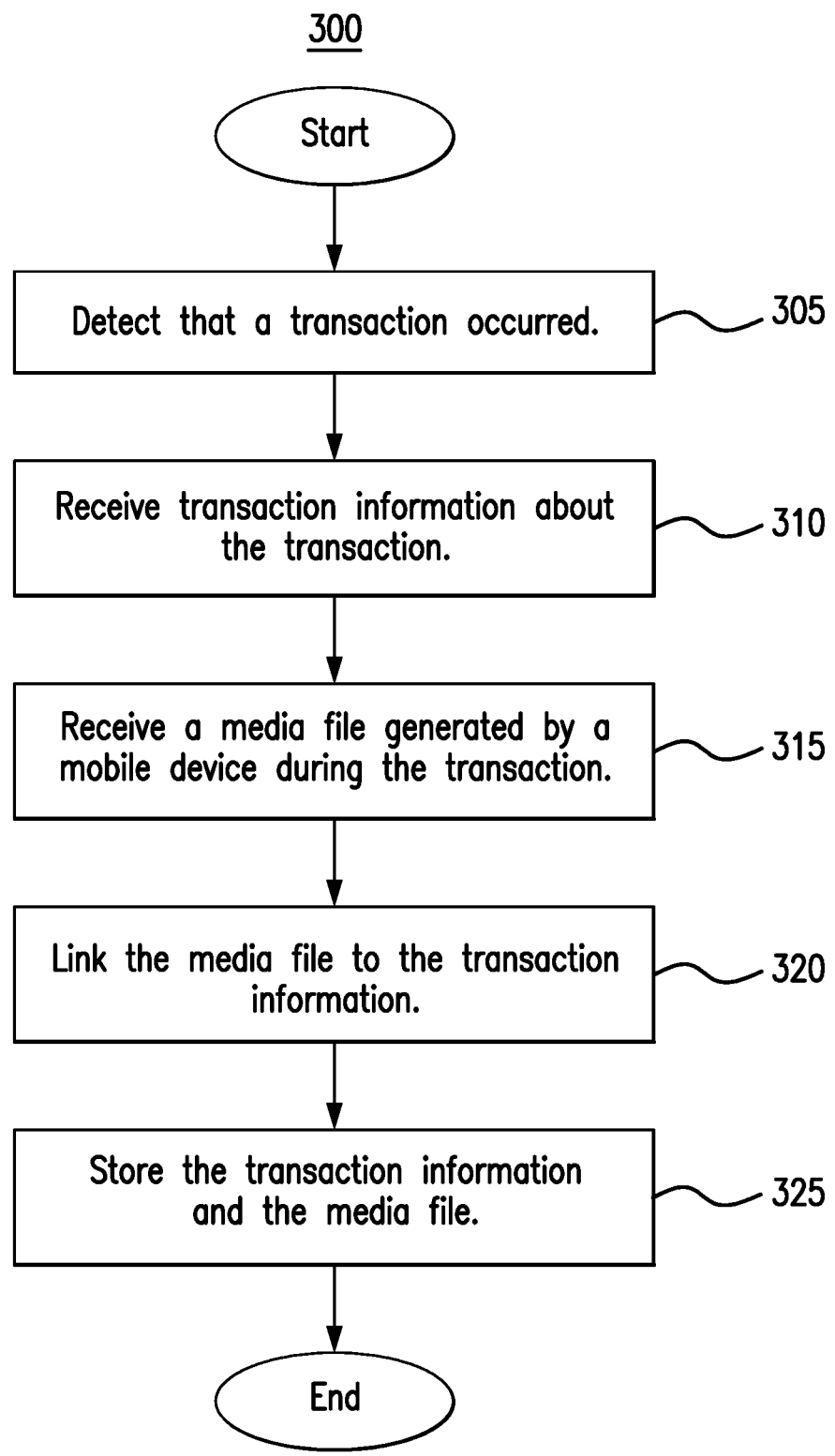
FIG. 3 is a flowchart illustrating a method for improving security using the system of FIG. 1.

Embodiments of the present disclosure and its advantages are best understood by referring to FIGS. 1 through 3 of the drawings, like numerals being used for like and corresponding parts of the various drawings.

Computers are used ubiquitously throughout organizations by members and employees to execute software. In many instances, users in the organization use their devices to access software (e.g., applications) internal to the organization. The users provide authentication credentials and internal security restrictions are applied to the users' access to the software. For example, the security restrictions may limit access to the application based on a user's role in the organization or the level of security software present on the user's device. As another example, the security restrictions may limit when (e.g., time of day restrictions) or from where (e.g., geographic restrictions) a user may access the application. Thus, the organizations are able to control their users' access and use of the internal software.

In some instances, however, users may access and use software that is external to the organization. For example, the users may try to access or use third-party applications through the organizations' networks. These third-party applications may not use the same (if any) security restrictions that the organizations use, and these third-party applications may not monitor or control the users the same way that the organizations do. For example, many third-party applications are accessible through a standard Internet connection and require only that a username and password be supplied. These applications do not verify a user's role, geographic location, or access privileges based on time of day or setting. As a result, use of the third-party applications may pose security risks and threats (e.g., data breaches, thefts, hacks, etc.) that are uncontrollable by the organizations.

This disclosure contemplates an access control tool that allows an organization to control access and use of third-party applications. The access control tool establishes an access control protocol with a third-party application so that the third-party application can apply the organization's security restrictions to the organization's users. When a user attempts to access the third-party application, the access control tool first verifies the user against the organization's security restrictions and then redirects the user to the third-party application. If the user attempts to access the third-party application directly, the third-party application will redirect the user to the access control tool per the access control protocol. In this manner, the access control tool makes it more difficult for the organization's security restrictions to be bypassed in certain instances. The access control tool will be described in more detail using FIGS. 1 through 3.

FIG. 1 illustrates an example security system 100. As seen in FIG. 1, system 100 includes one or more devices 110, a network 115, and a security tool 120. Generally, security tool 120 links media files that were generated at the time of a transaction to the transaction information. These media files can then be presented to a user when that user wants to see information about the transaction. Using the media files, security tool 120 improves fraud detection by making it easier to detect a fraudulent transaction in certain embodiments.

Device 110 is any suitable device for performing a transaction, such as, for example, a purchase. A user 105 uses a device 110 to conduct transactions with a merchant 108. Merchant 108 may use a separate device 110 to facilitate the transaction. For example, user 105 may use a computer or mobile phone to initiate a transaction. Merchant 108 may use a payment terminal or register to complete the transaction by accepting payment. In some instances, a fraudulent user impersonates user 105 to conduct a transaction using credentials that belong to user 105.

After the transaction is performed, transaction information is logged and, at a later time, presented in an accounting statement (e.g., a monthly billing statement) to user 105. The accounting statement provides details about the transaction so that the user has a record of the transaction that was performed. In many instances, these accounting statements present information that does not help the user identity the transaction. For example, a merchant name on the accounting statement may be an unrecognizable name or ID string. Additionally, in many instances, the only other information besides the merchant name provided in the accounting statement is a dollar value of the transaction, which may not help user 105 remember the transaction. Faced with a lack of helpful information, user 105 may not recognize when a transaction that appears on the accounting statement is a fraudulent transaction. These fraudulent transactions then go unreported, which opens user 105 to additional fraudulent transactions occurring on the account. To help user 105 identify fraudulent transactions, system 100 uses security tool 120 to link media files to transaction information. These media files can then be presented to user 105 to help user 105 identify whether a transaction is fraudulent.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Security tool 120 improves fraud detection by linking media files to transaction information in certain embodiments. As seen in FIG. 1, security tool 120 includes a processor 125 and a memory 130. This disclosure contemplates processor 125 and memory 130 being configured to perform any of the functions of security tool 120 described herein. In certain embodiments, security tool 120 improves fraud detection for user 105, and in some embodiments, security tool 120 improves fraud detection by automatically detecting fraudulent transactions.

Processor 125 is any electronic circuitry, including, but not limited to microprocessors, application specific integrated circuits (ASIC), application specific instruction set processor (ASIP), and/or state machines, that communicatively couples to memory 130 and controls the operation of security tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of security tool 120 by processing information received from network 115, device(s) 110, and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Security tool 120 can detect that a transaction has occurred between user 105 and merchant 108. For example, security tool 120 can detect that a transaction has occurred when a device 110, such as a device 110 of merchant 108, communicates transaction information to security tool 120. In some instances, security tool 120 receives transaction information from a device 110 of a user 105.

Transaction information 135 is received by security tool 120. Transaction information 135 includes information about the transaction. For example, transaction information 135 includes identification information for user 105 and/or device 110 of user 105. In the illustrated example of FIG. 2, that information is represented by a user ID and a device ID. Transaction information 135 can also include identification information for merchant 108. In the illustrated example of FIG. 2, that information is represented by a merchant ID and a device ID. Transaction information 135 may include multiple device IDs such as, for example, a device ID for a device 110 of user 105, and a device ID for a device of 110 of merchant 108. Transaction information 135 can also include a price for the transaction. Transaction information 135 can also include an identification of a payment method used by user 105. That information is represented by a payment ID in the illustrated example of FIG. 1. For example, if user 105 uses a credit card to pay for the transaction, the payment ID may include the credit card information for user 105.

In many instances, the information contained in transaction information 135 is insufficient to remind user 105 the details of the transaction at a later time. For example, user 105 may not be able to remember the transaction using solely the merchant ID and the price. As a result, when user 105 is presented transaction information 135 at a later time, such as, for example, in an accounting statement, user 105 may not be able to identify whether the transaction identified by transaction information 135 is fraudulent or not. If the transaction is fraudulent, user 105 may then fail to report the transaction as fraudulent and subsequent fraudulent transactions may continue to occur on the account of user 105.

Generally, security tool 120 aids user 105 in detecting fraudulent transactions by linking media files and other information to transaction information 135. The linked information can then be presented to user 105, in addition to transaction information 135, to help user 105 remember the details of the transaction.

Security tool 120 receives media files 140 and 145. Media files 140 and 145 may have been generated by one or more devices 110 at the time of the transaction. Media files 140 and 145 may be any suitable media file, such as, for example, an audio file, a video file, and/or a picture. Security tool 120 receives media files 140 and 145 around the time that transaction information 135 is received.

As an example operation, user 105 may use a mobile phone to initiate a transaction with merchant 108. Merchant 108 may use a cash register or other smart terminal to facilitate the transaction. When user 105 uses the mobile phone to initiate payment, the mobile phone may begin capturing pictures and/or video. Likewise, the merchant terminal, such as the cash registrar or smart terminal, may begin capturing video and/or pictures. These captured pictures and/or video may then be sent to security tool 120. If, for example, user 105 is paying for groceries at a grocery store, the mobile phone of user 105 may begin capturing video of the items that user 105 bought, the look and feel of the grocery store, and the appearance of the cashier. Likewise, the merchant terminal may begin capturing pictures and/or video of the items that user 105 purchased, the appearance of user 105, and the appearance of the cashier. These captured pictures and media files are then sent to security tool 120.

Security tool 120 receives media files 140 and 145 and links them to transaction information 135. Media file 140 may be generated by device 110 of user 105. Media file 145 may be generated by device 110 of merchant 108. This disclosure contemplates security tool 120 linking media files 140 and 145 to transaction information 135 in any appropriate manner. For example, security tool 120 may maintain a database table where a common ID is assigned to media files 140 and 145 and to transaction information 135. That common ID may then be used to retrieve media files 140 and 145 when transaction information 135 is retrieved.

In some embodiments, security tool 120 may also receive geolocation 150 and link geolocation 150 to transaction information 135. Geolocation 150 may be generated by a device 110 of user 105 and/or by a device 110 of merchant 108. Geolocation 150 may indicate that the geolocation of device 110 of user 105 and/or the geolocation of the device 110 of merchant 108 during the transaction. Geolocation 150 may then be used to help remind user 105 of where user 105 was or where merchant 108 was when the transaction was performed. Similar to media files 140 and 145, geolocation 150 is linked to transaction information 135 in any suitable manner (e.g., by a common ID in a database).

Security tool 120 stores transaction information 135, media files 140 and 145, and/or geolocation 150 in memory 130. For example, security tool 120 may store transaction information 135, media files 140 and 145, and/or geolocation 150 in a database in memory 130. When any of this stored information is needed, security tool 120 may retrieve that information from memory 130. For example, security tool 120 may retrieve the information from memory 130 to prepare an accounting statement 155.

Accounting statement 155 includes information about transactions performed by user 105. For example, accounting statement 155 may include transaction information 135. In addition, accounting statement 155 may include media files 140 and 145 and/or geolocation 150 to help user 105 identify the transaction identified by transaction information 135. Security tool 120 may communicate accounting statement 155 to a device 110 of user 105. User 105 may view media files 140 and 145 in accounting statement 155. In addition, user 105 may see the geolocation 150 in accounting statement 155. In this manner, even if user 105 does not recognize the transaction using transaction information 135 alone, user 105 may also have media files 140 and 145 and geolocation 150 in accounting statement 155 to help user 105 recognize the transaction.

Using media files 140 and 145 and geolocation 150, user 105 can determine whether a transaction is fraudulent or not. For example, user 105 can view media file 145 to see that a different, unrecognized person initiated the transaction with merchant 108. As another example, user 105 can view geolocation 150 to see whether user 105 recognizes the location of merchant 108. If user 105 determines that user 105 did not initiate the transaction, user 105 can flag the transaction as fraudulent. Appropriate security restrictions may then be placed on the account of user 105 to prevent future fraudulent activity.

In this manner security tool 120 aids user 105 in identifying fraudulent transactions. Security tool 120 may make it easier for user 105 to identify fraudulent transaction by presenting media files 140 and 145 and/or geolocation 150 to user 105 in accounting statement 155 in certain embodiments.

FIG. 2 illustrates portions of the example security system 100 of FIG. 1. As seen in FIG. 2, a user 105B may be impersonating a user 105A when initiating a transaction with merchant 108. FIG. 2 illustrates an example operation of security tool 120 during this fraudulent transaction.

Security tool 120 receives transaction information 135 that identifies the transaction between user 105B and merchant 108. At the time of the transaction, merchant 108, or a terminal or device of 108, generates media file 145 and geolocation 150A. Media file 145 may be a picture or video of merchant 108 and/or user 105B. Geolocation 150A may be the geolocation of merchant 108. Security tool 120 receives media file 145 and geolocation 150A and links them to transaction information 135.

Likewise, at the time of transaction, a device of user 105A generates media file 140 and geolocation 150B. Because user 105B is impersonating user 105A, the device of user 105A and not user 105B generates media file 140 and geolocation 150B. Media file 140 may be an image or video of the surroundings of user 105A at the time of the transaction with merchant 108. Geolocation 150B may show the location of user 105A during the transaction. Security tool 120 receives media file 140 and geolocation 150B and links them to transaction information 135.

Security tool 120 retrieves transaction information 135, media files 140 and 145, and geolocations 150A and 150B to prepare accounting statement 155. Accounting statement 155 may include transaction information 135, media files 140 and 145, and geolocations 150A and 150B. When user 105A reviews accounting statement 155, user 105A may view media files 140 and 145. Upon seeing media files 140 and 145, user 105A may determine that user 105A did not perform the transaction identified by transaction information 135. For example, user 105A may view media file 145 and see that user 105B performed the transaction. In a similar manner, user 105A may see geolocation 150A and determine that user 105A does not recognize merchant 108 or has never been to the location of merchant 108.

In response, user 105A may initiate a dispute 205. Security tool 120 receives dispute 205 and links dispute 205 to accounting statement 155. In some embodiments, security tool 120 retrieves transaction information 135, media files 140 and 145, and/or geolocations 150A and 150B in response to receiving dispute 205. Security tool 120 may then flag the account shown in accounting statement 155 as compromised and prevent future transactions, which reduces the number of fraudulent transactions on the account of user 105A.

In some embodiments, security tool 120 may review media files 140 and 145 and/or geolocations 150A and 150B to determine automatically whether the transaction is fraudulent. For example, security tool 120 may examine geolocations 150A and 150B to determine that they are not within a range threshold of one another. For example, security tool 120 may determine that geolocation 150A is not within 50 feet of geolocation 150B. In response, security tool 120 raises auto dispute 210 and flags the transaction as fraudulent. Security tool 120 may then prevent future transactions from being conducted on the account of user 105A, thus preventing additional fraudulent activity from occurring. In some embodiments, security tool 120 may determine that a transaction is fraudulent by reviewing media files 140 and 145 to determine that media files 140 and 145 are not about the same transaction. For example, security tool 120 may determine that media file 140 was taken when user 105A was walking around a park and media file 145 was taken in a grocery store. In response, security tool 120 raises auto dispute 210 to flag the transaction as fraudulent.

In some embodiments, security tool 120 may retrieve additional information to link to transaction information 135 to help user 105A determine whether the transaction is fraudulent. For example, security tool 120 may retrieve media files 140 from a social media page of user 105A. Security tool 120 may determine that these media files 140 were generated around the time that the transaction was performed. Security tool 120 then retrieves these media files 140 and links them to transaction information 135. As an example, if merchant 108 is a restaurant, security tool 120 may retrieve pictures of food and/or dishes that appear on the social media page of user 105A around the time of the transaction at the restaurant. These images may then help remind user 105A of the dishes and/or food that were purchased from the restaurant.

In certain embodiments, security tool 120 reduces the amount of fraudulent activity on the account of user 105A by receiving and linking media files 140 and 145 and/or geolocations 150A and 150B to transaction information 135. Security tool 120 is able to present this information along with transaction information 135 at a later time. This additional information may help user 105A recognize the transaction as fraudulent or as legitimate. In some instances, security tool 120 may also review media files 140 and 145 and/or geolocations 150A and 150B to automatically determine whether a transaction is fraudulent and raise an auto-dispute 210.

FIG. 3 is a flowchart illustrating method 300 for improving security using the system 100 of FIG. 1. In particular embodiments, security tool 120 performs the steps of method 300. By performing method 300, security tool 120 reduces the amount of fraudulent activity on the account of a user.

Security tool 120 begins by detecting that a transaction occurred in step 305. In step 310, security tool 120 receives transaction information about the transaction. Security tool 120 then receives a media file generated by a mobile device during the transaction in step 315. In step 320, security tool 120 links the media file to the transaction information. In step 325, security tool 120 stores the transaction information and the media file in a memory.

Modifications, additions, or omissions may be made to method 300 depicted in FIG. 3. Method 300 may include more, fewer, or other steps. For example, steps may be performed in parallel or in any suitable order. While discussed as security tool 120 (or components thereof) performing the steps, any suitable component of system 100, such as device(s) 110 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a hardware processor communicatively coupled to the memory, the hardware processor configured to:
receive transaction information about a transaction that occurred, the transaction information comprising an identification of a merchant performing the transaction and credentials of a first user, wherein:
a second user initiated the transaction, the second user impersonating the first user;
a mobile device of the first user is configured to generate a first media file at a time of the transaction; and
a merchant device comprises at least one of a cash register and a smart terminal and is configured to:
accept and process payments; and
generate a second media file at the time of the transaction;
receive, from the mobile device, the first media file generated by the mobile device during the transaction, the first media file comprising at least one of video of surroundings of the first user during the transaction and a picture of the surroundings of the first user during the transaction;
receive, from the merchant device, the second media file generated from the merchant device during the transaction, the second media file comprising at least one of video of an item purchased during the transaction and a picture of the item purchased during the transaction;
receive, from the mobile device, a geolocation of the mobile device during the transaction;
receive, from the merchant device, a geolocation of the merchant device during the transaction;
link the first media file, the second media file, the geolocation of the mobile device, and the geolocation of the merchant device to the transaction information, wherein linking the first media file, the second media file, the geolocation of the mobile device, and the geolocation of the merchant device to the transaction information comprises assigning a common identification number to each of the first media file, the second media file, the geolocation of the mobile device, the geolocation of the merchant device, and the transaction information;
store the transaction information, the first media file, the second media file, the geolocation of the mobile device, and the geolocation of the merchant device according to the common identification number in a database in the memory;
automatically determine, based on the first media file, the second media file, the geolocation of the mobile device, and the geolocation of the merchant device, that the transaction is fraudulent, wherein determining that the transaction is fraudulent comprises:
comparing the first media file to the second media file;
determining that the first media file and the second media file are not both about the transaction;
comparing the geolocation of the mobile device during the transaction to the geolocation of the merchant device during the transaction; and
determining that the geolocation of the mobile device during the transaction is not within a range threshold of the geolocation of the merchant device during the transaction; and
in response to determining that the transaction is fraudulent:
flag the transaction as fraudulent; and
prevent future transactions from an account of the first user used to perform the transaction.

2. The apparatus of claim 1, wherein the transaction information further comprises an identification of the merchant device.

3. The apparatus of claim 1, wherein the hardware processor is further configured to:
retrieve a third media file from a social media account of the first user, the third media file generated within an hour of the transaction;
link the third media file to the transaction information; and
store the third media file in the memory.

4. The apparatus of claim 3, wherein:
linking the third media file to the transaction information comprises assigning the common identification number to the third media file; and
storing the third media file in the memory comprises storing the third media file according to the common identification number in the database in the memory.

5. The apparatus of claim 3, wherein:
the merchant is a restaurant; and
the third media file comprises a picture of food.

6. The apparatus of claim 1, wherein the hardware processor is further configured to:
receive a transaction dispute for the transaction; and
retrieve, in response to the transaction dispute, the transaction information and the first media file.

7. The apparatus of claim 1, wherein:
the first media file comprises a first picture;
the second media file comprises a second picture; and
the hardware processor is further configured to generate an accounting statement that displays the transaction information with the first media file and the second media file.

8. A method comprising:
receiving transaction information about a transaction that occurred, the transaction information comprising an identification of a merchant performing the transaction and credentials of a first user, wherein:
a second user initiated the transaction, the second user impersonating the first user;
a mobile device of the first user is configured to generate a first media file at a time of the transaction; and
a merchant device comprises at least one of a cash register and a smart terminal and is configured to:
accept and process payments; and
generate a second media file at the time of the transaction;
receiving, from the mobile device, the first media file generated by the mobile device during the transaction, the first media file comprising at least one of video of surroundings of the first user during the transaction and a picture of the surroundings of the first user during the transaction;
receiving, from the merchant device, the second media file generated from the merchant device during the transaction, the second media file comprising at least one of video of an item purchased during the transaction and a picture of the item purchased during the transaction;
receiving, from the mobile device, a geolocation of the mobile device during the transaction;

receiving, from the merchant device, a geolocation of the merchant device during the transaction;

linking the first media file, the second media file, the geolocation of the mobile device, and the geolocation of the merchant device to the transaction information, wherein linking the first media file, the second media file, the geolocation of the mobile device, and the geolocation of the merchant device to the transaction information comprises assigning a common identification number to each of the first media file, the second media file, the geolocation of the mobile device, the geolocation of the merchant device, and the transaction information;

storing the transaction information, the first media file, the second media file, the geolocation of the mobile device, and the geolocation of the merchant device according to the common identification number in a database;

automatically determining, based on the first media file, the second media file, the geolocation of the mobile device, and the geolocation of the merchant device, that the transaction is fraudulent, wherein determining that the transaction is fraudulent comprises:

comparing the first media file to the second media file;

determining that the first media file and the second media file are not both about the transaction;

comparing the geolocation of the mobile device during the transaction to the geolocation of the merchant device during the transaction; and determining that the geolocation of the mobile device during the transaction is not within a range threshold of the geolocation of the merchant device during the transaction; and in response to determining that the transaction is fraudulent:

flag the transaction as fraudulent; and prevent future transactions from an account of the first user used to perform the transaction.

9. The method of claim 8, wherein the transaction information further comprises an identification of the merchant device.

10. The method of claim 8, further comprising:

retrieving a third media file from a social media account of the first user, the third media file generated within an hour of the transaction;

linking the third media file to the transaction information; and storing the third media file in the memory.

11. The method of claim 10, wherein:

linking the third media file to the transaction information comprises assigning the common identification number to the third media file; and storing the third media file in the memory comprises storing the third media file according to the common identification number in the database.

12. The method of claim 10, wherein:

the merchant is a restaurant; and the third media file comprises a picture of food.

13. The method of claim 8, further comprising:

receiving a transaction dispute for the transaction; and retrieving, in response to the transaction dispute, the transaction information and the first media file.

14. The method of claim 8, further comprising generating an accounting statement that displays the transaction information with the first media file and the second media file, wherein the first media file comprises a first picture and the second media file comprises a second picture.

15. A system comprising:

a mobile device of a first user;

a merchant device; and a security tool configured to:

receive transaction information about a transaction that occurred involving the merchant device, the transaction information comprising an identification of the merchant of the merchant device and credentials of a first user, wherein:

a second user initiated the transaction, the second user impersonating the first user;

the mobile device of the first user is configured to generate a first media file at a time of the transaction; and the merchant device comprises at least one of a cash register and a smart terminal and is configured to:

accept and process payments; and generate a second media file at the time of the transaction;

receive, from the mobile device, the first media file generated by the mobile device during the transaction, the first media file comprising at least one of video of surroundings of the first user during the transaction and a picture of the surroundings of the first user during the transaction;

receive, from the merchant device, the second media file generated by the merchant device during the transaction, the second media file comprising at least one of video of an item purchased during the transaction and a picture of the item purchased during the transaction;

receive, from the mobile device, a geolocation of the mobile device during the transaction;

receive, from the merchant device, a geolocation of the merchant device during the transaction;

link the first media file, the second media file, the geolocation of the mobile device, and the geolocation of the merchant device to the transaction information, wherein linking the first media file, the second media file the geolocation of the mobile device, and the geolocation of the merchant device to the transaction information comprises assigning a common identification number to each of the first media file, the second media file, the geolocation of the mobile device, the geolocation of the merchant device, and the transaction information;

store the transaction information, the first media file, the second media file, the geolocation of the mobile device, and the geolocation of the merchant device according to the common identification number in a database;

automatically determine, based on the first media file, the second media file, the geolocation of the mobile device, and the geolocation of the merchant device, that the transaction is fraudulent, wherein determining that the transaction is fraudulent comprises:

comparing the first media file to the second media file;

determining that the first media file and the second media file are not both about the transaction;

comparing the geolocation of the mobile device during the transaction to the geolocation of the merchant device during the transaction; and determining that the geolocation of the mobile device during the transaction is not within a range threshold of the geolocation of the merchant device during the transaction; and in response to determining that the transaction is fraudulent:

flag the transaction as fraudulent; and prevent future transactions from an account of the first user used to perform the transaction.

16. The system of claim 15, wherein the transaction information further comprises an identification of the merchant device.

17. The system of claim 15, wherein the security tool is further configured to:

retrieve a third media file from a social media account of the first user, the third media file generated within an hour of the transaction;

link the third media file to the transaction information; and store the third media file in the memory.

18. The system of claim 17, wherein:

linking the third media file to the transaction information comprises assigning the common identification number to the third media file; and storing the third media file in the memory comprises storing the third media file according to the common identification number in the database.

19. The system of claim 15, wherein the security tool is further configured to:

receive a transaction dispute for the transaction; and retrieve, in response to the transaction dispute, the transaction information and the first media file.

20. The system of claim 15, wherein:

the first media file comprises a first picture;

the second media file comprises a second picture; and the security tool is further configured to generate an accounting statement that displays the transaction information with the first media file and the second media file.

\* \* \* \* \*